July 19, 1938.     R. H. WHITELEY     2,123,872
SELF LUBRICATING BEARING
Filed Jan. 6, 1936     2 Sheets-Sheet 1
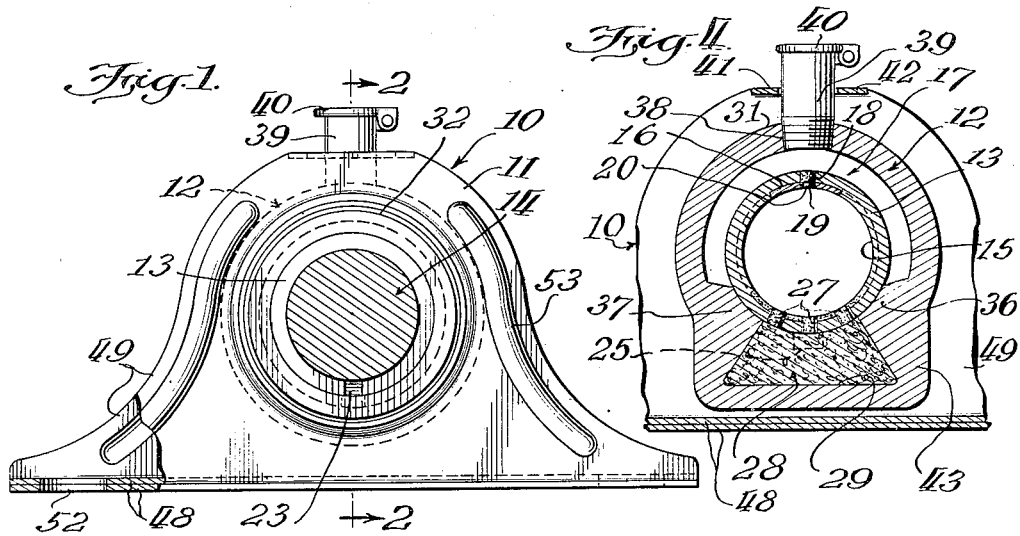
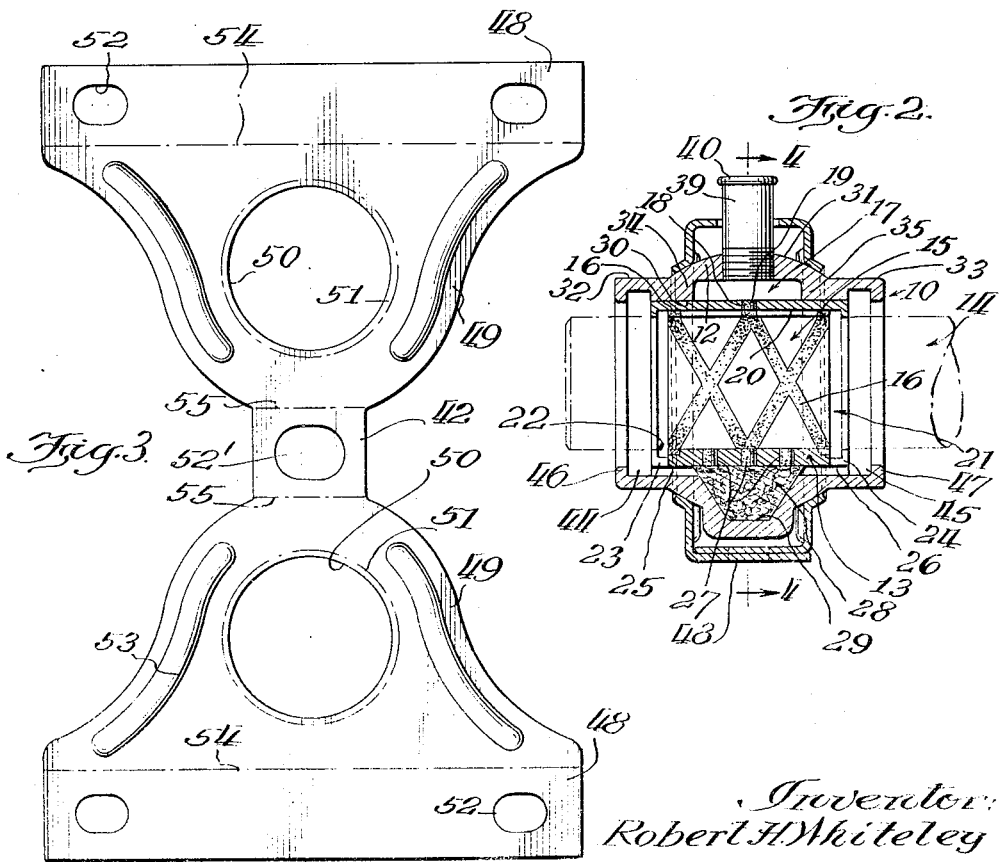
Inventor:
Robert H. Whiteley
By Williams, Bradbury, McCaleb & Hinkle
Attys.

July 19, 1938.   R. H. WHITELEY   2,123,872
SELF LUBRICATING BEARING
Filed Jan. 6, 1936   2 Sheets-Sheet 2
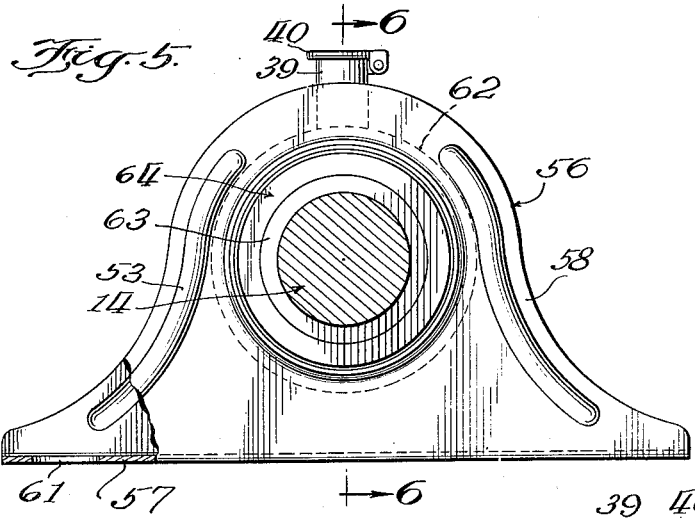
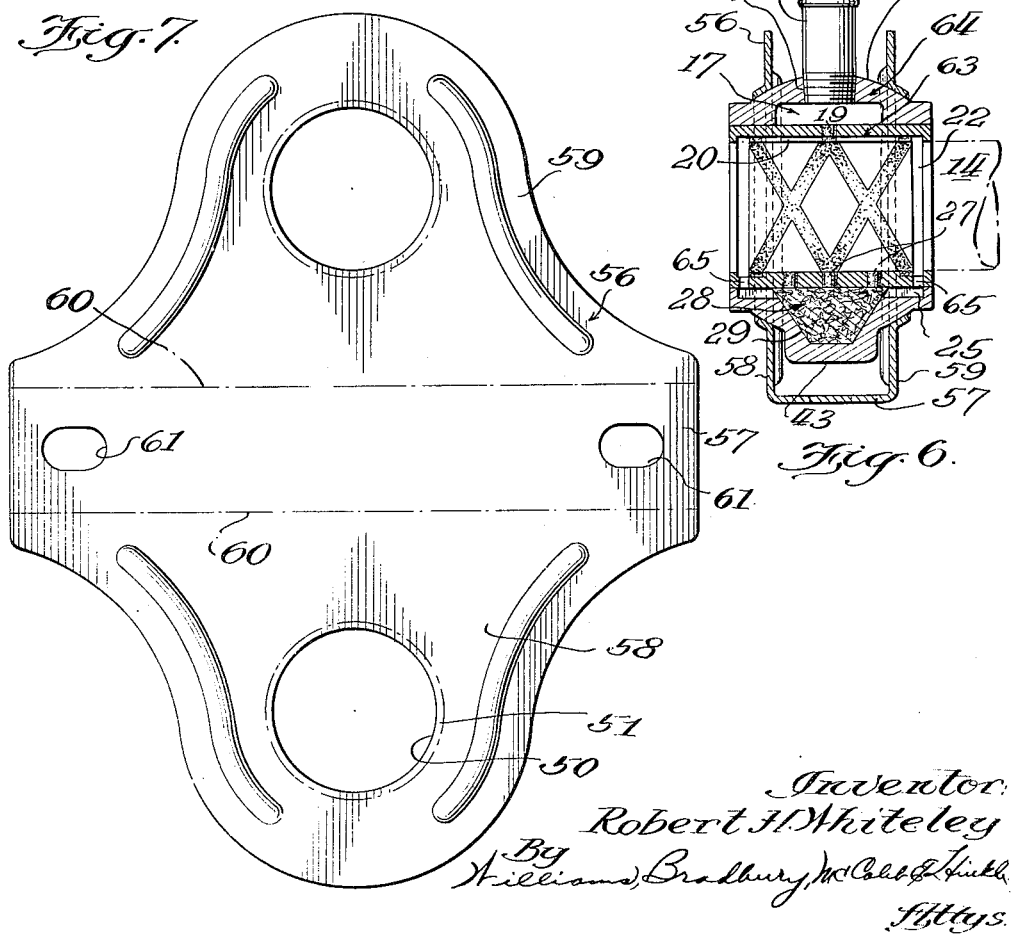
Inventor:
Robert H. Whiteley Patented July 12, 1938

2,123,872

UNITED STATES PATENT OFFICE 2,123,872

SELF-LUBRICATING BEARING

Robert H. Whiteley, Oak Park, Ill., assignor to Robert H. Whiteley, trustee

Application January 6, 1936, Serial No. 57,735

5 Claims. (Cl. 308—121)

The present invention relates to self-lubricating bearings, and is particularly concerned with bearings of the universal type employing one or more reservoirs for a supply of lubricant which is dispensed automatically in measured amounts, depending upon the heat of the bearing and other factors.

In some of the bearings of the prior art of this general type there has been some loss of lubricant along the shaft of the bearing or by being thrown off from the rotating shaft as the lubricant is dispensed from the reservoir to the bearing surface.

One of the objects of the present invention is the provision of an improved bearing structure by means of which this excess lubricant will be gathered, conserved and employed over again, thus substantially doubling the lubricant life of the bearing without necessity for refilling during that period.

Another object of the invention is the provision of an improved arrangement for collecting, conserving and re-employing excess lubricant in bearings of the type described, thereby decreasing the possibility of the bearing ever running dry after its preliminary filling.

Another object of the invention is the provision of a plurality of forms of universally supported bearings of the "pillow block" type, in which such parts as are adaptable to manufacture by sheet metal are so constructed that they may be stamped out of sheet metal.

Another object of the invention is the provision of an improved bearing of the class described, in which the ball structure of the bearing is resiliently supported between a pair of resilient sheet metal arms in order to reduce any possibility of rattling and to provide for the automatic taking up of wear between these parts.

Another object of the invention is the provision of an improved bearing of the class described which is sturdy, economical, and which may be manufactured at a much lower cost than the devices of the prior art because of the elimination of many machining operations and the use of a structure which involves stamping or punching operations.

Other objects and advantages of the invention will be apparent from the following description and the accompanying drawings, in which similar characters of reference indicate similar parts throughout the several drawings.

Referring to the drawings, of which there are two sheets,

Fig. 1 is a side elevational view of a "pillow block" bearing constructed according to the present invention, showing the shaft used, with the bearing in section;

Fig. 2 is a vertical sectional view taken on the plane of the line 2—2 of Fig. 1, looking in the direction of the arrows;

Fig. 3 is a plan view of the stamping which is used for the supporting body of Fig. 1;

Fig. 4 is a vertical sectional view taken on the plane of the line 4—4 of Fig. 2, looking in the direction of the arrows;

Fig. 5 is a view similar to Fig. 1, of a modification;

Fig. 6 is a vertical sectional view taken on the plane of the line 6—6 of Fig. 5, looking in the direction of the arrows, showing the details of structure;

Fig. 7 is a plan view of the stamping used to make the supporting body of Fig. 5.

Referring to Fig. 1, 10 indicates in its entirety the complete self-lubricating bearing structure, which includes a supporting body 11 for supporting a ball shaped reservoir 12. The ball shaped reservoir 12 carries the bearing sleeve 13 for rotatably supporting a shaft 14.

Referring to Fig. 2, the bearing sleeve 13 which is shown is of the cylindrical type, having an inner cylindrical bearing surface 15, which is preferably formed with a plurality of diagonally extending grooves which intersect each other and distribute lubricant over the entire surface of the bearing.

The grooves 16 communicate with a primary reservoir 17 by apertures 18, which are filled with lubricant-distributing plugs 19 of porous carbon or the like. The grooves 16 are also filled with a filling of porous carbon compound, the compound being placed in the grooves and apertures while in its plastic state and being baked to render it porous. This compound may be of various types. One example is the initially plastic graphite compound which is now on the market, and which includes graphite with a suitable binder, the compound being rendered porous and solid by baking.

The bearing sleeve is preferably provided with the empty longitudinally extending clean-out or oil collecting groove 20, the sharp edges of which are adapted to scrape excess lubricant from the shaft 14, and which is also adapted to remove foreign materials which might otherwise be ground into the shaft or bearing surface and damage the surface. At each end of the bearing sleeve 13 it is preferably provided with a peripherally extending groove 21—22, located just inside the end of the bearing sleeve and adapted to collect the excess lubricant which is thrown off from the shaft 14 and to conduct the lubricant to a secondary reservoir.

The grooves 21, 22 communicate with slots 23, 24 in bearing sleeve 13 at the bottom so that this excess lubricant may run down into grooves 25, 26 formed in the ball member of the bearing. A plurality of additional apertures 27 may be formed in the lower part of the bearing and filled with porous carbon lubricant-conducting plugs, some of which communicate with the carbon in the grooves 16, and others of which merely conduct lubricant to the bearing surface 15 of the sleeve.

These plugs 27 are all located so as to be in contacting engagement with a lubricant-conducting filling 28 carried by the secondary reservoir 29 formed in the ball member of the bearing. The lubricant-conducting filling 28 may in some embodiments of the invention consist of porous carbon extensions of the plug 27, in which case the plugs 27 would have to be formed after the sleeve is placed in the ball; otherwise they would be sheared off. I prefer, however, to form these plugs in the bearing sleeve before the bearing is assembled, and therefore prefer to utilize a filling 28, which may consist of any suitable material, such as vegetable, animal or mineral fibers adapted to conduct lubricant by capillary attraction to the plugs 27. For example, the fibers or wicking 28 may consist of wool or cotton or asbestos.

The ball member 12 comprises a cast metal member which is formed with an internal cylindrical bore 30, which is adapted to receive the bearing sleeve 13 with a close liquid-tight fit. These parts may be assembled by means of a machine press. The ball member 12 has an external ball formation 31 and carries at each end a substantially cylindrical extension 32, 33. It has a major reservoir 17 cored in the ball formation and extending peripherally of the sleeve 13, and defined at each side by the inwardly extending radial flanges 34, 35. At the bottom this reservoir is terminated by the radially inwardly extending flanges 36, 37 which engage the sleeve 13 and also extend longitudinally across the ends of the reservoir, forming partitions between the major reservoir 17 and the minor or secondary reservoir 29.

The major reservoir 17 preferably has a threaded opening 38 at its top for receiving an oil cup 39, which may have a spring pressed cap 40 to assure closure of this cup. The oil cup or tube 39 extends through an aperture 41 in the top strap 42 of the supporting member, and there is suitable clearance between the oil cup 39 an the walls of aperture 41 so that the ball may have universal movement in its support.

The inwardly extending flanges 34, 35, 36, 37 of the ball member have inner cylindrical surfaces for engaging the sleeve 13. The ball member 12 is also preferably provided with a depending rectangular formation 43 which is hollowed out to form the substantially trapezoidal secondary lubricant chamber 29. This chamber communicates at each end with the slots 25, 26 which conduct lubricant that is thrown off by the shaft or which leaks out at the ends of the bearing to the secondary reservoir.

The ball member is also preferably provided with the peripherally extending internal grooves 44, 45 located in the lateral extensions 32, 33, and bounded by the inwardly extending radial flanges 46, 47 at each end. These grooves also communicate with the longitudinal grooves 25, 26 and serve to collect additional waste lubricant that might be thrown off by the shaft 14.

Referring to Fig. 3, this is a plan view of the supporting member for the ball of the bearing in the form of a blank which has not yet been bent as shown in Fig. 1. It comprises a sheet metal member having an attaching flange 48 at each end, a pair of body portions 49, and the joining strap or yoke 42.

The two body portions 49 are each formed with the apertures 50 bordered by the outwardly extending partially spherical flange 51 in each case and substantially fitting the partially spherical surface 31 of the ball member 12. The aperture at the end of the spherical flange 51 is still larger, however, than the cylindrical extension 32, 33 of the ball member 12 so as to provide sufficient clearance for a limited universal movement.

The attaching flanges 48 are provided with the oblong apertures 52 similarly located in each flange, so that when the flanges are bent to the position of Fig. 1 the similarly located apertures in these flanges register with each other. The yoke 42 is also provided with an enlarged oblong aperture 52', which is adapted to pass the oil cup 39 with a suitable clearance so as to permit a limited universal movement between the oil cup and the edges of aperture 52'. The two body portions 49 may be provided with suitable upwardly extending reinforcing ribs 53 comprising pressed formations.

The supporting body 11 is preferably made of resilient steel so that the flanges 51 will resiliently engage and grip the ball surface 31, permitting a universal movement, but preventing any rattling. The device is assembled as follows:

The sleeve 13 is pressed into the ball member 12 after the secondary reservoir 29 has been filled with the wicking, and the sleeve has, of course, been provided with suitable porous carbon fillings for its grooves and apertures. The supporting member 11 is bent at the bottom along the lines 54 so that the attaching flanges 48 extend inwards towards each other when the body is again bent along the lines 55.

The ball member is inserted with its cylindrical extensions 32, 33 extending through the apertures 50 and the flanges 51 engaging the ball formation, after which the supporting member 11 may be secured to a beam, floor, or other support by bolts passing through the apertures 52. The proportions of the parts are such that when these attaching flanges 48 are bolted together by the same bolts the flanges 51 resiliently engage the ball. The oil cup 39 may then be inserted in the top and threaded into its bore in the ball 12.

Referring to Figs. 5 to 7, this is a modification in which the supporting body 56 has a single attaching flange 57 located at the bottom and midway between two upwardly projecting side portions 58, 59. The blank shown in Fig. 7 is bent along the lines 60 to accomplish this result, and the body may be bolted to a beam or other support by bolts passing through the elongated apertures 61.

The structure of the supporting body 56 at the apertures 50 and flanges 51 is exactly the same as previously described, and the proportions of the parts are such that these apertures fit on the ball shaped formation 62.

Referring to Fig. 6, it will be noted that the bearing sleeve 63 and ball 64 have been arranged so that the end of the sleeve comes out flush with the end of the ball member and the groove 44 is eliminated in this embodiment. In this case the peripherally extending groove 22 in the sleeve 63 communicates with the groove 25 by a drilled hole 65, which is located in the groove 22 and passes through the sleeve. This embodiment of the invention is of advantage where it is desired to eliminate the longitudinally projecting extension of the ball member which has the groove 44 and flange 47.

Most if not all of the oil which is thrown off by the shaft just outside the bearing sleeve 63 would be caught by the groove 22, which is practically inside the bearing, and there would be no possibility of dirt collecting at the end of the bearing, as might be possible where the flange 47 and groove 44 are provided.

The operation of the bearing for the conservation of oil is as follows: The upper or major reservoir 17 in one embodiment of the invention is adapted to hold approximately sixteen centimeters of lubricant, which may be of the semi-solid type, such as petrolatum. This lubricant is given greater fluidity when the bearing warms up under operation and is dispensed over a long period of time.

As the lubricant is dispensed to the bearing surfaces, however, some of it inevitably leaks out the end of the bearing and along the shaft and tends to collect more at the bottom and end of the bearing, where it is collected by the grooves 22 and 44 in the devices constructed according to the present invention. The lubricant then runs along the groove 25 into the secondary reservoir 29, where it is absorbed by the wicking 28, which is in contact with the additional lubricating plugs in the apertures 27. Any waste lubricant is therefore collected and conserved, and this lower or secondary reservoir is adapted to receive a large portion of the lubricant dispensed from the upper reservoir. It need not be as big as the upper reservoir because it obviously would never collect the complete amount of lubricant dispensed from the upper reservoir, but might be two-thirds, three-fourths or five-sixths as large as the upper reservoir.

Thus the self-lubricating bearing, which, with the major reservoir, is adapted to run for a long period of time, may be adapted to run for approximately twice as long when provided with the secondary reservoir and means for conducting the lubricant to auxiliary lubricating plugs from the secondary reservoir.

It should be understood that the structure of the bearing and ball member of Figs. 1 to 4 may also be employed in that of Figs. 5 to 7, and vice versa, and simplified bearings may be also constructed which embody only a few of the features described herein, yet which include the important features of the invention.

It will thus be observed that excess lubricant which is dispensed from the reservoir by lubricating plugs is conserved, collected, and again used. The supporting structure for the bearing is also constructed of sheet metal in such manner that it may be manufactured with a minimum of machining operations.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A shaft hanger bearing comprising a bearing sleeve having a bearing surface, a ball-shaped reservoir member surrounding said sleeve and forming a reservoir with said sleeve, lubricant conducting members extending through said sleeve from said reservoir to the bearing surface of said sleeve and a support for said ball-shaped member comprising a resilient sheet metal member having a pair of parallel flanges joined at one edge by a yoke, each of said parallel flanges having at its opposite edge a transversely extending attaching flange, said attaching flanges extending in opposite directions and overlapping each other and having registering apertures for securing means, said parallel flanges also having a pair of aligned apertures bordered by partially spherical outwardly extending cylindrical flanges engaging said ball-shaped member whereby the bearing sleeve and reservoir are supported for universal movement.

2. A shaft hanger bearing comprising a bearing sleeve having a bearing surface, a ball-shaped reservoir member surrounding said sleeve and forming a reservoir with said sleeve, lubricant conducting members extending through said sleeve from said reservoir to the bearing surface of said sleeve and a support for said ball-shaped member comprising a resilient sheet metal member having a pair of parallel flanges joined at one edge by a yoke, each of said parallel flanges having at its opposite edge a transversely extending attaching flange, said attaching flanges extending in opposite directions and overlapping each other and having registering apertures for securing means, said parallel flanges also having a pair of aligned apertures bordered by partially spherical outwardly extending cylindrical flanges engaging said ball-shaped member whereby the bearing sleeve and reservoir are supported for universal movement, said ball-shaped member being provided with a depending auxiliary reservoir extension and having on its inside partitions on each side of said bearing sleeve and extending longitudinally thereof to form an auxiliary reservoir in said extension, said bearing sleeve having oil-catching grooves at each end and said ball-shaped member having cylindrical extensions at each end of said bearing with oil-catching grooves surrounding said shaft but spaced therefrom.

3. In a bearing, the combination of a bearing member provided with an externally ball shaped body, with a sheet metal supporting member comprising a member formed with a central yoke, a pair of bearing portions, one on each side of said yoke, each of said bearing portions having laterally projecting partially spherical flanges engaging the exterior surface of said ball-shaped body and an attaching flange carried by each of said bearing portions, said attaching flanges extending substantially parallel to said yoke, and said bearing portions extending substantially parallel to each other, said attaching flanges being over-lapped and provided with apertures for securing devices whereby the same securing devices may secure both flanges.

4. In a bearing, the combination of a bearing member provided with an externally ball shaped body, with a sheet metal supporting member comprising a member formed with a central yoke, a pair of bearing portions, one on each side of said yoke, each of said bearing portions having laterally projecting partially spherical flanges engaging the exterior surface of said ball-shaped body and an attaching flange carried by each of said bearing portions, said attaching flanges extending substantially parallel to said yoke, and said bearing portions extending substantially parallel to each other, said attaching flanges being over-lapped and provided with apertures for securing devices whereby the same securing devices may secure both flanges, said bearing comprising a cylindrical metal member formed with diagonally extending grooves communicating with apertures extending through said cylindrical member, and said cylindrical member being secured in said ball shaped body and formed with said ball shaped body in communication with said grooves, said grooves being filled with an initially plastic porous carbon compound for conducting lubricant to the bearing surface.

5. In a bearing, the combination of a bearing member provided with an externally ball shaped body, with a sheet metal supporting member comprising a member formed with a central yoke, a pair of bearing portions, one on each side of said yoke, each of said bearing portions having laterally projecting partially spherical flanges engaging the exterior surface of said ball-shaped body and an attaching flange carried by each of said bearing portions, said attaching flanges extending substantially parallel to said yoke, and said bearing portions extending substantially parallel to each other, said attaching flanges being over-lapped and provided with apertures for securing devices whereby the same securing devices may secure both flanges, said bearing comprising a cylindrical metal member formed with diagonally extending grooves communicating with apertures extending through said cylindrical member, and said cylindrical member being secured in said ball shaped body and formed with said ball shaped body in communication with said grooves, said grooves being filled with an initially plastic porous carbon compound for conducting lubricant to the bearing surface, said ball shaped body having an auxiliary reservoir and conduits leading from the lower part of said bearing surface to said auxiliary reservoir for receiving waste lubricant, and means in said auxiliary reservoir for conducting waste lubricant back to said porous carbon filling.

ROBERT H. WHITELEY.